United States Patent
Lee et al.

(10) Patent No.: US 11,196,517 B2
(45) Date of Patent: Dec. 7, 2021

(54) METHOD AND APPARATUS FOR CONTROLLING PACKET DUPLICATION

(71) Applicant: LG ELECTRONICS INC., Seoul (KR)

(72) Inventors: Jaewook Lee, Seoul (KR); Youngdae Lee, Seoul (KR); Jongwoo Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/639,511

(22) PCT Filed: Oct. 8, 2018

(86) PCT No.: PCT/KR2018/011816
§ 371 (c)(1),
(2) Date: Feb. 14, 2020

(87) PCT Pub. No.: WO2019/070107
PCT Pub. Date: Apr. 11, 2019

(65) Prior Publication Data
US 2020/0213045 A1    Jul. 2, 2020

Related U.S. Application Data

(60) Provisional application No. 62/627,769, filed on Feb. 8, 2018, provisional application No. 62/569,485, filed
(Continued)

(51) Int. Cl.
*H04L 1/18* (2006.01)
*H04W 4/44* (2018.01)
(Continued)

(52) U.S. Cl.
CPC ............ *H04L 1/1858* (2013.01); *H04L 45/74* (2013.01); *H04L 47/29* (2013.01); *H04L 47/32* (2013.01);
(Continued)

(58) Field of Classification Search
CPC ....... H04L 1/1858; H04L 45/74; H04L 47/29; H04L 47/32; H04L 69/322; H04W 4/44; H04W 76/27
(Continued)

(56) References Cited

U.S. PATENT DOCUMENTS

2018/0324642 A1* 11/2018 Yu ............................. H04L 1/22

FOREIGN PATENT DOCUMENTS

| EP | 3116260 | 1/2017 | |
|---|---|---|---|
| WO | 2017/014802 | 1/2017 | |
| WO | WO-2019061182 A1 * | 4/2019 | ............ H04W 80/02 |

OTHER PUBLICATIONS

R2-1705727.pdf (Year: 2017).*
62502552P (provisional application) (Year: 2017).*
R2-1703731.pdf (Year: 2017).*
PCT International Application No. PCT/KR2018/011816, International Search Report dated Jan. 15, 2019, 2 pages.
(Continued)

*Primary Examiner* — Peter Chen
*Assistant Examiner* — Intekhaab A Siddiquee
(74) *Attorney, Agent, or Firm* — Lee, Hong, Degerman, Kang & Waimey

(57) ABSTRACT

Provided is a method for generating a packet by a user equipment (UE). The method may include: receiving a threshold for packet duplication, from a base station; when a number of duplicated packets for a certain time does not satisfy the threshold for the packet duplication, generating a second packet by duplicating a first packet; and transmitting the generated second packet.

12 Claims, 13 Drawing Sheets

Related U.S. Application Data on Oct. 7, 2017, provisional application No. 62/569,481, filed on Oct. 7, 2017.

(51) Int. Cl.
| | | |
|---|---|---|
| *H04W 76/27* | (2018.01) |
| *H04L 12/741* | (2013.01) |
| *H04L 12/801* | (2013.01) |
| *H04L 12/823* | (2013.01) |
| *H04L 29/08* | (2006.01) |

(52) U.S. Cl.
CPC ............ *H04L 69/322* (2013.01); *H04W 4/44* (2018.02); *H04W 76/27* (2018.02)

(58) Field of Classification Search
USPC ....................................................... 370/329
See application file for complete search history.

(56) References Cited

OTHER PUBLICATIONS

Huawei et al., "Dynamic activation/deactivation of packet duplication," 3GPP TSG-RAN2 #98, R2-1704835, Hangzhou, China, May 15-19, 2017, 3 pages.
ZTE, "Consideration on the activation/deactivation of data duplication for CA," 3GPP TSG-RAN WG2 Meeting #98, R2-1704660, Hangzhou, China, May 15-19, 2017, 4 pages.
Ericsson, "Packet duplication for PC5," 3GPP TSG-RAN WG2 #99bis, R2-1711496, Prague, Czech Republic, Oct. 9-13, 2017, 4 pages.
European Patent Office Application Serial No. 18864309.2, Search Report dated May 3, 2021, 12 pages.
ITL, "Configuration of PDCP duplication," 3GPP TSG-RAN WG2 Meeting #99, R2-1709628, Aug. 2017, 3 pages.

* cited by examiner

METHOD AND APPARATUS FOR CONTROLLING PACKET DUPLICATION

CROSS-REFERENCE TO RELATED APPLICATIONS

This application is the National Stage filing under 35 U.S.C. 371 of International Application No. PCT/KR2018/011816, filed on Oct. 8, 2018, which claims the benefit of U.S. Provisional Application No. 62/569,481, filed on Oct. 7, 2017, 62/569,485, filed on Oct. 7, 2017, and 62/627,769, filed on Feb. 8, 2018, the contents of which are all hereby incorporated by reference herein in their entirety.

BACKGROUND OF THE DISCLOSURE

Field of the Disclosure

The present invention relates to a wireless communication system, and more particularly, to a method for controlling the amount of packet duplication and an apparatus supporting the same.

Related Art

LTE may be configured to support device-to-device (D2D) communication, vehicle-to-vehicle (V2V) communication, and/or vehicle-to-everything (V2X) communication utilizing proximity-based services (ProSe), which may include devices configured to interface with the vehicle-to-infrastructure/network (V2I/N) (e.g., vehicle-to-pedestrian (V2P), pedestrian-to-vehicle (P2V), road side unit (RSU)). In these instances, vehicles may perform message transmissions using resources assigned by the network (e.g. eNB, or RSU) or pre-configured for V2X use.

5G networks are being architected to support three service categories:
- eMBB (Enhanced mobile broadband): High bandwidth internet access suitable for web browsing, video streaming, and virtual reality. This is an internet access service we are used to with smartphones.
- mMTC (Massive machine type communication): Narrow-band internet access for sensing, metering, and monitoring devices.
- URLLC (Ultra-reliable low latency communication): Services for latency sensitive devices for applications like factory automation, autonomous driving, and remote surgery. These applications require sub-millisecond latency with error rates that are lower than 1 packet loss in $10^6$ packets.

Meanwhile, the key motivation for packet duplication is regarded to have reliability for V2X sidelink communication as the transmissions over sidelink could be unreliable due to e.g. collision. However, the duplication of the same message on multiple carriers would increase the channel busyness of each carrier and it would consequently increase the collision rate. Furthermore, from the network point of view, the packet duplication could cause some problem. When first UEs supporting the packet duplication and second UEs not supporting the packet duplication share the same resource pools, the network may not know how many the first UEs in RRC_IDLE duplicate the same messages on the pools. Since the network may not know how many the first UEs in RRC_IDLE duplicate the same messages on the pools, the network would not be able to well manage the sidelink resource pool. In order to solve the above problems, a method for controlling the amount of packet duplication and an apparatus supporting the same need to be suggested.

SUMMARY OF THE DISCLOSURE

One embodiment provides a method for generating a packet by a user equipment (UE). The method may include: receiving a threshold for packet duplication, from a base station; when the number of duplicated packets for a certain time does not satisfy the threshold for the packet duplication, generating a second packet by duplicating a first packet; and transmitting the generated second packet.

Another embodiment provides a user equipment (UE) for generating a packet. The UE may include: a memory; a transceiver; and a processor connected with the memory and the transceiver, wherein the processor is configured to: control the transceiver to receive a threshold for packet duplication from a base station, generate a second packet by duplicating a first packet when the number of duplicated packets for a certain time does not satisfy the threshold for the packet duplication, and control the transceiver to transmitting the generated second packet.

Another embodiment provides a method for transmitting a threshold for packet duplication by a base station. The method may include: transmitting the threshold for the packet duplication, to a user equipment (UE), wherein the UE generates a second packet by duplicating a first packet and transmits the generated second packet, when the number of duplicated packets for a certain time does not satisfy the threshold for the packet duplication.

A network is able to control the level of packet duplication while guaranteeing the reliability of a packet.

DESCRIPTION OF EXEMPLARY EMBODIMENTS

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (DL). For example, only OFDMA may be used for DL and only SC-FDMA may be used for UL. Alternatively, OFDMA and SC-FDMA may be used for DL and/or UL.

Figure 1:
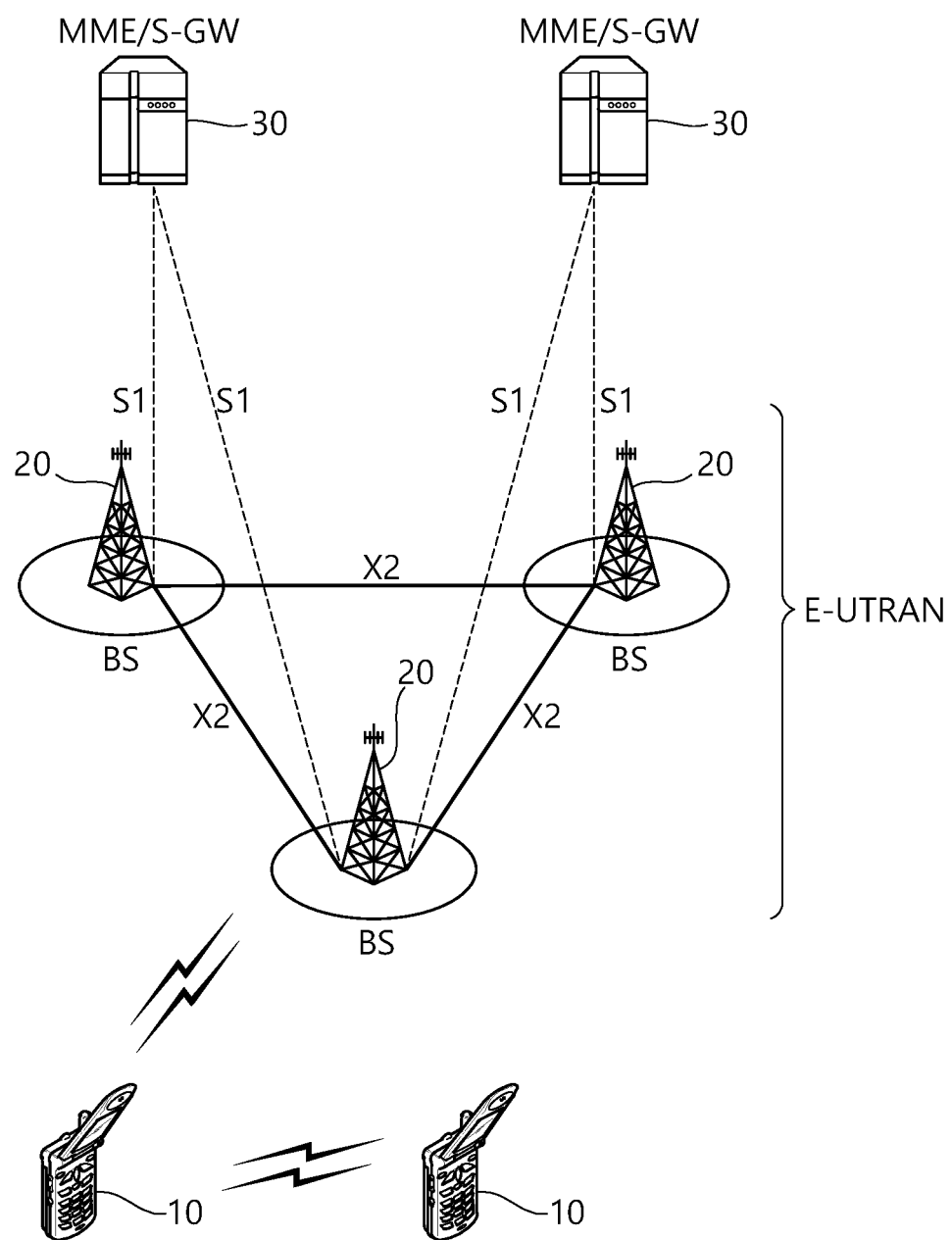
FIG. 1 shows an example of a wireless communication system to which technical features of the present invention may be applied.

FIG. 1 shows an example of a wireless communication system to which technical features of the present invention may be applied. Specifically, FIG. 1 shows a system architecture based on an evolved-UMTS terrestrial radio access network (E-UTRAN). The aforementioned LTE is a part of an evolved-UTMS (e-UMTS) using the E-UTRAN.

Referring to FIG. 1, the wireless communication system includes one or more user equipment (UE; 10), an E-UTRAN and an evolved packet core (EPC). The UE 10 refers to a communication equipment carried by a user. The UE 10 may be fixed or mobile. The UE 10 may be referred to as another terminology, such as a mobile station (MS), a user terminal (UT), a subscriber station (SS), a wireless device, etc.

The E-UTRAN consists of one or more base station (BS) 20. The BS 20 provides the E-UTRA user plane and control plane protocol terminations towards the UE 10. The BS 20 is generally a fixed station that communicates with the UE 10. The BS 20 hosts the functions, such as inter-cell radio resource management (MME), radio bearer (RB) control, connection mobility control, radio admission control, measurement configuration/provision, dynamic resource allocation (scheduler), etc. The BS may be referred to as another terminology, such as an evolved NodeB (eNB), a base transceiver system (BTS), an access point (AP), etc.

A downlink (DL) denotes communication from the BS 20 to the UE 10. An uplink (UL) denotes communication from the UE 10 to the BS 20. A sidelink (SL) denotes communication between the UEs 10. In the DL, a transmitter may be a part of the BS 20, and a receiver may be a part of the UE 10. In the UL, the transmitter may be a part of the UE 10, and the receiver may be a part of the BS 20. In the SL, the transmitter and receiver may be a part of the UE 10.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 30 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 10 is connected to the BS 20 by means of the Uu interface. The UEs 10 are interconnected with each other by means of the PC5 interface. The BSs 20 are interconnected with each other by means of the X2 interface. The BSs 20 are also connected by means of the S1 interface to the EPC, more specifically to the MME by means of the S1-MME interface and to the S-GW by means of the S1-U interface. The S1 interface supports a many-to-many relation between MMEs/S-GWs and BSs.

Figure 2:
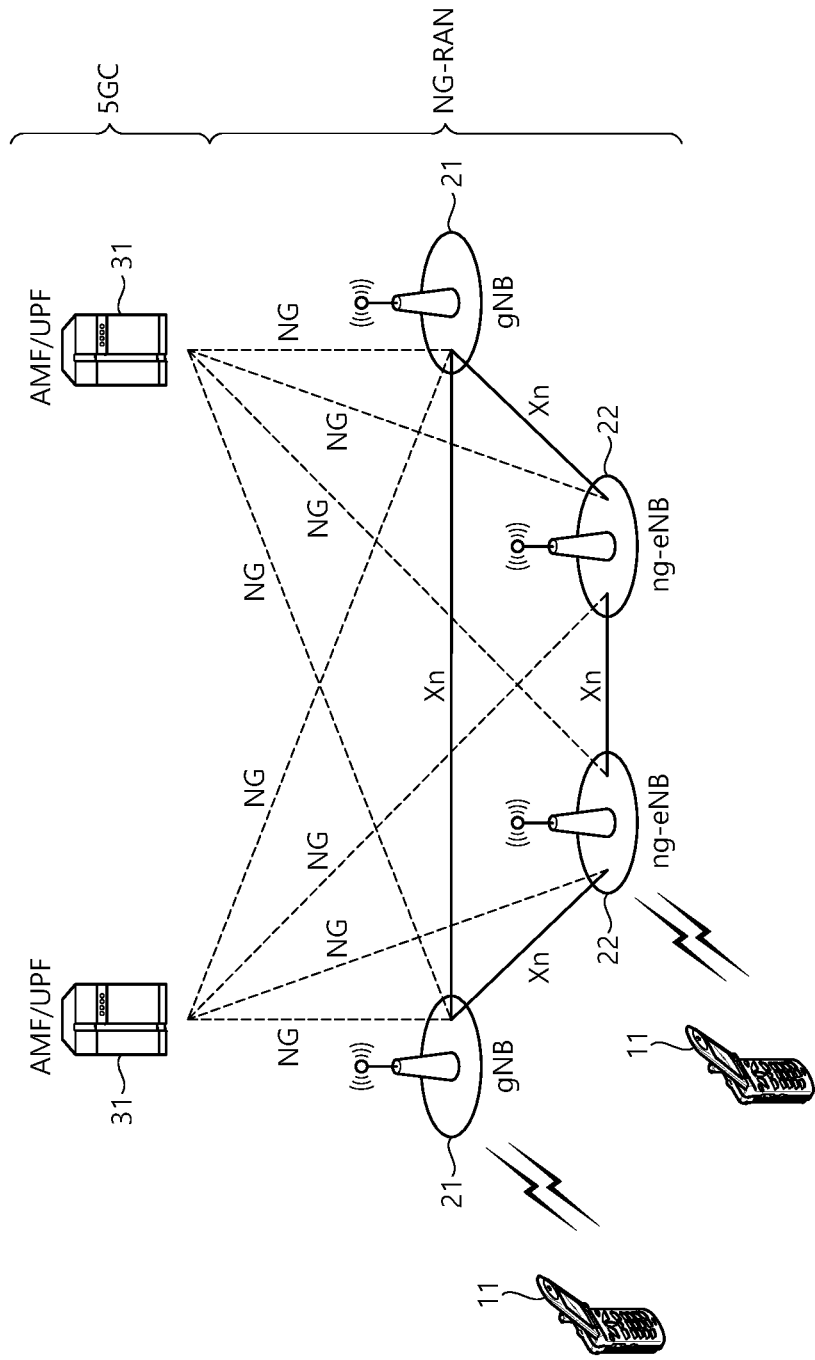
FIG. 2 shows another example of a wireless communication system to which technical features of the present invention may be applied.

FIG. 2 shows another example of a wireless communication system to which technical features of the present invention may be applied. Specifically, FIG. 2 shows a system architecture based on a 5G new radio access technology (NR) system. The entity used in the 5G NR system (hereinafter, simply referred to as "NR") may absorb some or all of the functions of the entities introduced in FIG. 1 (e.g. eNB, MME, S-GW). The entity used in the NR system may be identified by the name "NG" for distinction from the LTE/LTE-A.

Referring to FIG. 2, the wireless communication system includes one or more UE 11, a next-generation RAN (NG-RAN) and a 5th generation core network (5GC). The NG-RAN consists of at least one NG-RAN node. The NG-RAN node is an entity corresponding to the BS 10 shown in FIG. 1. The NG-RAN node consists of at least one gNB 21 and/or at least one ng-eNB 22. The gNB 21 provides NR user plane and control plane protocol terminations towards the UE 11. The ng-eNB 22 provides E-UTRA user plane and control plane protocol terminations towards the UE 11.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs and ng-eNBs are interconnected with each other by means of the Xn interface. The gNBs and ng-eNBs are also connected by means of the NG interfaces to the 5GC, more specifically to the AMF by means of the NG-C interface and to the UPF by means of the NG-U interface.

A protocol structure between network entities described above is described. On the system of FIG. 1 and/or FIG. 2, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 3:
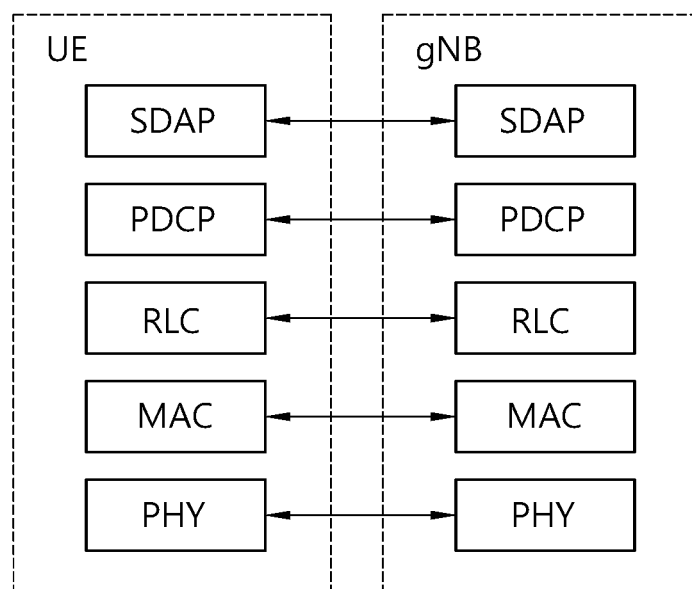
FIG. 3 shows a block diagram of a user plane protocol stack to which technical features of the present invention may be applied.
Figure 4:
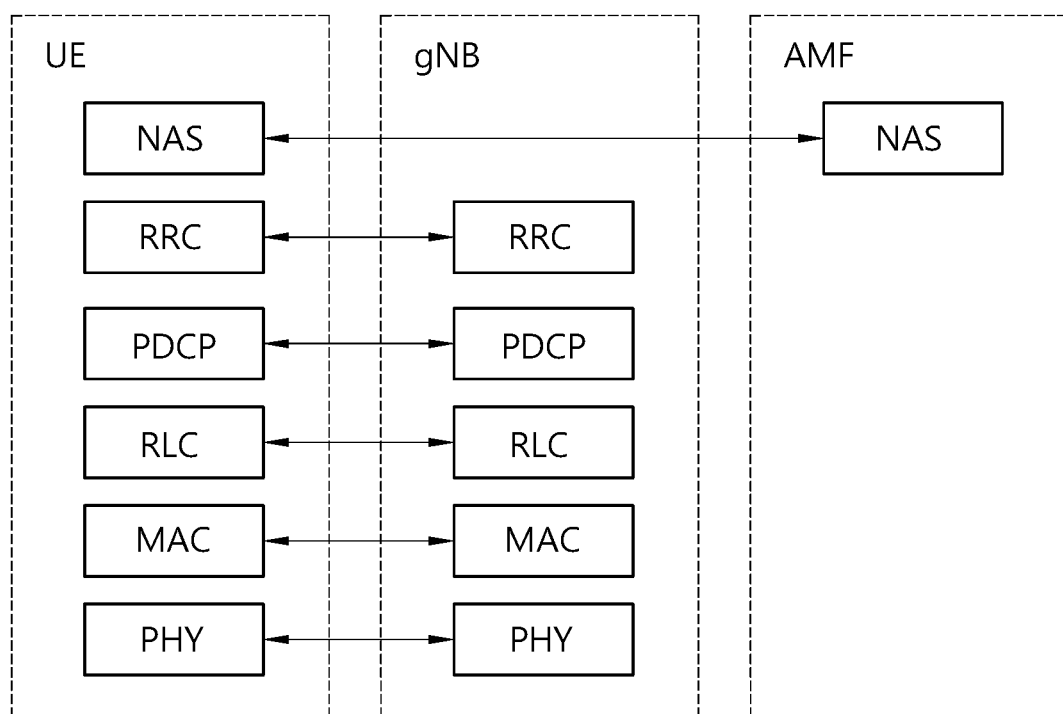
FIG. 4 shows a block diagram of a control plane protocol stack to which technical features of the present invention may be applied.

FIG. 3 shows a block diagram of a user plane protocol stack to which technical features of the present invention may be applied. FIG. 4 shows a block diagram of a control plane protocol stack to which technical features of the present invention may be applied. The user/control plane protocol stacks shown in FIG. 3 and FIG. 4 are used in NR. However, user/control plane protocol stacks shown in FIG.

3 and FIG. 4 may be used in LTE/LTE-A without loss of generality, by replacing gNB/AMF with eNB/MME.

Referring to FIG. 3 and FIG. 4, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the base station.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Figure 5:
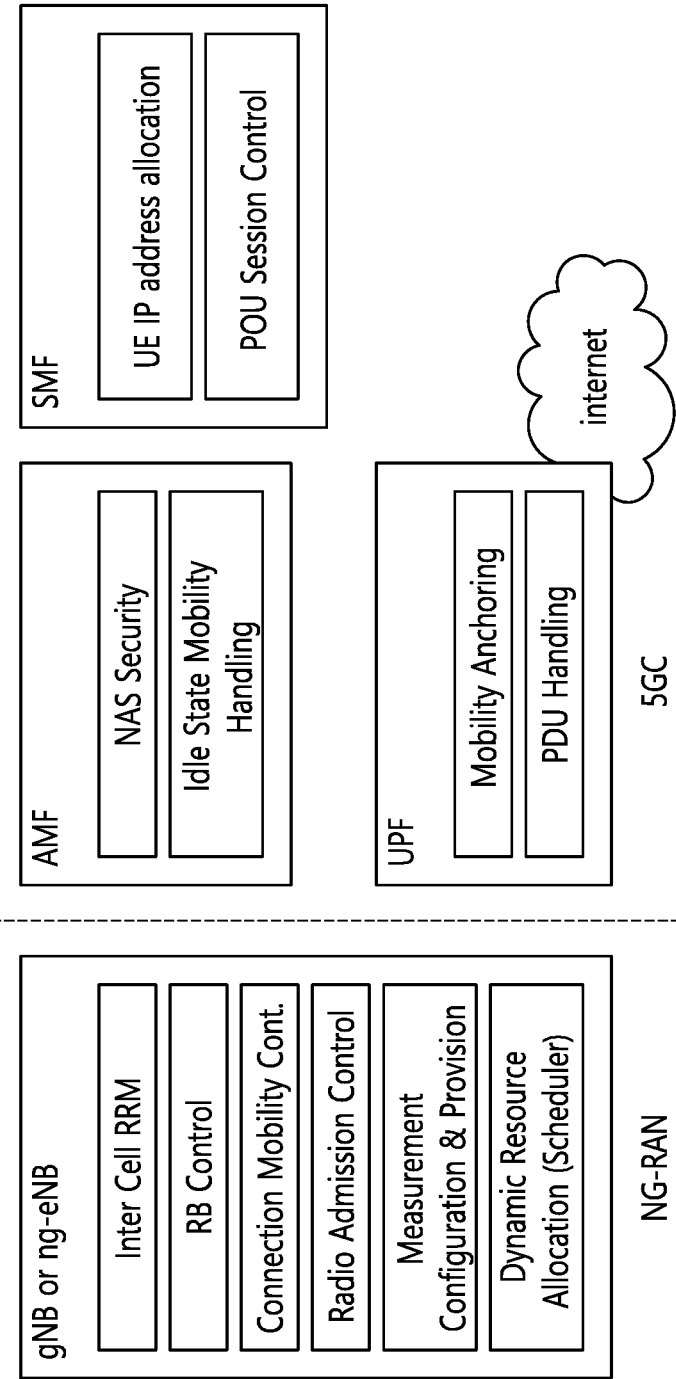
FIG. 5 shows functional split between NG-RAN and 5GC to which technical features of the present invention may be applied.

FIG. 5 shows functional split between NG-RAN and 5GC to which technical features of the present invention may be applied.

Referring to FIG. 5, the gNB and ng-eNB may host the following functions:
    Functions for Radio Resource Management: Radio Bearer Control, Radio Admission Control, Connection Mobility Control, Dynamic allocation of resources to UEs in both uplink and downlink (scheduling);
    IP header compression, encryption and integrity protection of data;
    Selection of an AMF at UE attachment when no routing to an AMF can be determined from the information provided by the UE;
    Routing of User Plane data towards UPF(s);
    Routing of Control Plane information towards AMF;
    Connection setup and release;
    Scheduling and transmission of paging messages;
    Scheduling and transmission of system broadcast information (originated from the AMF or O&M);
    Measurement and measurement reporting configuration for mobility and scheduling;
    Transport level packet marking in the uplink;
    Session Management;
    Support of Network Slicing;
    QoS Flow management and mapping to data radio bearers;
    Support of UEs in RRC_INACTIVE state;
    Distribution function for NAS messages;
    Radio access network sharing;
    Dual Connectivity;
    Tight interworking between NR and E-UTRA.

The Access and Mobility Management Function (AMF) may host the following main functions:
    NAS signalling termination;
    NAS signalling security;
    AS Security control;
    Inter CN node signalling for mobility between 3GPP access networks;
    Idle mode UE Reachability (including control and execution of paging retransmission);
    Registration Area management;
    Support of intra-system and inter-system mobility;
    Access Authentication;
    Access Authorization including check of roaming rights;
    Mobility management control (subscription and policies);
    Support of Network Slicing;
    SMF selection.

The User Plane Function (UPF) may host the following main functions:
    Anchor point for Intra-/Inter-RAT mobility (when applicable);
    External PDU session point of interconnect to Data Network;
    Packet routing & forwarding;
    Packet inspection and User plane part of Policy rule enforcement;
    Traffic usage reporting;
    Uplink classifier to support routing traffic flows to a data network;
    Branching point to support multi-homed PDU session;
    QoS handling for user plane, e.g. packet filtering, gating, UL/DL rate enforcement;
    Uplink Traffic verification (SDF to QoS flow mapping);
    Downlink packet buffering and downlink data notification triggering.

The Session Management function (SMF) may host the following main functions:
    Session Management;
    UE IP address allocation and management;
    Selection and control of UP function;
    Configures traffic steering at UPF to route traffic to proper destination;
    Control part of policy enforcement and QoS;
    Downlink Data Notification.

Hereinafter, V2X communication is described.

Figure 6:
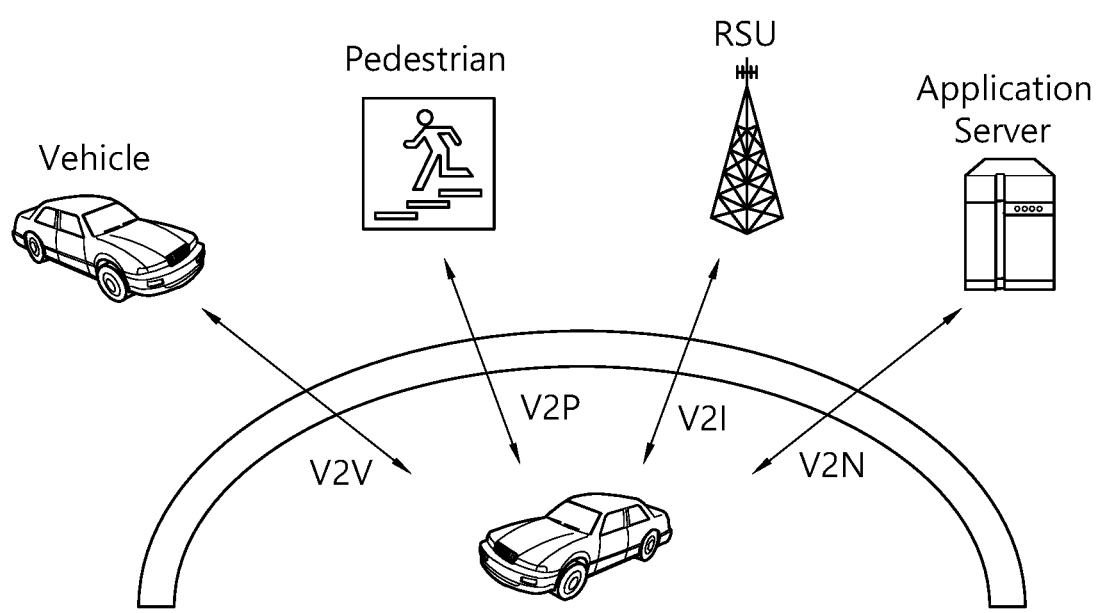
FIG. 6 shows types of V2X applications to which technical features of the present invention may be applied.

FIG. 6 shows types of V2X applications to which technical features of the present invention may be applied.

Referring to FIG. 6, the V2X applications in the present specification, referred to as vehicle-to-everything (V2X), contain the following four different types:
Vehicle-to-Vehicle (V2V)
Vehicle-to-Infrastructure (V2I)
Vehicle-to-Network (V2N)
Vehicle-to-Pedestrian (V2P)

V2X services can be provided by PC5 interface and/or Uu interface. Support of V2X services via PC5 interface is provided by V2X sidelink communication, which is a mode of communication whereby UEs can communicate with each other directly over the PC5 interface. This communication mode is supported when the UE is served by E-UTRAN and when the UE is outside of E-UTRA coverage. Only the UEs authorised to be used for V2X services can perform V2X sidelink communication.

Hereinafter, packet duplication is described.

The support of ultra-reliable and low latency communications (URLLC) services is facilitated by logical channel prioritization (LCP) restrictions and the packet duplication.

When duplication is configured for a radio bearer by RRC, a secondary RLC entity and a secondary logical channel are added to the radio bearer to handle the duplicated PDCP PDUs. Duplication at PDCP therefore consists in submitting the same PDCP PDUs twice: once to the primary RLC entity and a second time to the secondary RLC entity. With two independent transmission paths, packet duplication therefore increases reliability and reduces latency and is especially beneficial for URLLC services. Desirably, PDCP control PDUs are not duplicated and always submitted to the primary RLC entity.

When duplication is activated, the original PDCP PDU and the corresponding duplicate shall not be transmitted on the same carrier. The two different logical channels can either belong to the same MAC entity (e.g. in carrier aggregation) or to different ones (e.g. in dual connectivity). In the former case, logical channel mapping restrictions are used in MAC to ensure that the logical channel carrying the original PDCP PDUs and logical channel carrying the corresponding duplicates are not sent on the same carrier.

When an RLC entity acknowledges the transmission of a PDCP PDU, the PDCP entity shall indicate to the other RLC entity to discard it; and when the secondary RLC entity reaches the maximum number of retransmissions for a PDCP PDU, the UE informs the base station but does not trigger RLF.

When configuring duplication for a DRB, RRC also sets the initial state (either activated or deactivated). After the configuration, the state can then be dynamically controlled by means of a MAC control element and in dual connectivity, the UE applies the MAC CE commands regardless of their origin (e.g. MCG or SCG). When duplication is deactivated for a DRB, the secondary RLC entity is not re-established, the HARQ buffers are not flushed but the corresponding logical channel mapping restrictions—if any—are lifted, and the transmitting PDCP entity should indicate to the secondary RLC entity to discard all duplicated PDCP PDUs.

When duplication is configured for an SRB the state is always active and cannot be dynamically controlled.

When activating duplication for a DRB, the base station should ensure that at least one serving cell is activated for each logical channel of the DRB; and when the deactivation of secondary cells (SCells) leaves no serving cells activated for a logical channel of the DRB, the base station should ensure that duplication is also deactivated.

Also, sidelink packet duplication is supported for V2X sidelink communication and is performed at PDCP layer of the UE. For sidelink packet duplication for transmission, a PDCP PDU is duplicated at the PDCP entity. The duplicated PDCP PDUs of the same PDCP entity are submitted to two different RLC entities and associated to two different sidelink logical channels respectively. The duplicated PDCP PDUs of the same PDCP entity are only allowed to be transmitted on different sidelink carriers.

Meanwhile, the key motivation for packet duplication is regarded to have reliability for V2X sidelink communication as the transmissions over sidelink could be unreliable due to e.g. collision. However, the duplication of the same message on multiple carriers would increase the channel busyness of each carrier and it would consequently increase the collision rate. While increased collision rate may not be significant impact to UEs of using duplication as it would be likely that the packet would be successfully delivered in some carriers, the increased collision rate would severely deteriorate the reliability of the UE of not using duplication feature. Considering the same resource pools can be used by a first UE supporting the packet duplication (e.g. Rel-15 V2X UE) and a second UE not supporting the packet duplication (e.g. Rel-14 V2X UE), the increased collision rate could be critical aspect for poor performance of the second UE not supporting the packet duplication. That is, duplication of the same message on multiple carriers will increase collision in resource selection, and duplication could degrade reliability in congestion especially for legacy UEs having no duplication on the same resource pool.

Furthermore, from the network point of view, the packet duplication could cause some problem. When first UEs supporting the packet duplication and second UEs not supporting the packet duplication share the same resource pools, the network may not know how many the first UEs in RRC_IDLE duplicate the same messages on the pools. This may mean that the network does not know the cause of the congestion of the pool. The congestion can be caused by such as increase of the number of vehicles, the number of shorter periodicity messages or the packet duplication. If the network could know that the reason for the congestion is due to the packet duplication, the network could manage the level of duplication or sidelink pool capacity. However, since the network may not know how many the first UEs in RRC_IDLE duplicate the same messages on the pools, the network would not be able to well manage the sidelink resource pool.

In order to solve the above problems, the amount of packet duplication needs to be controlled. Hereinafter, according to an embodiment of the present invention, a method for controlling the level of packet duplication and an apparatus supporting the same is described.

Figure 7:
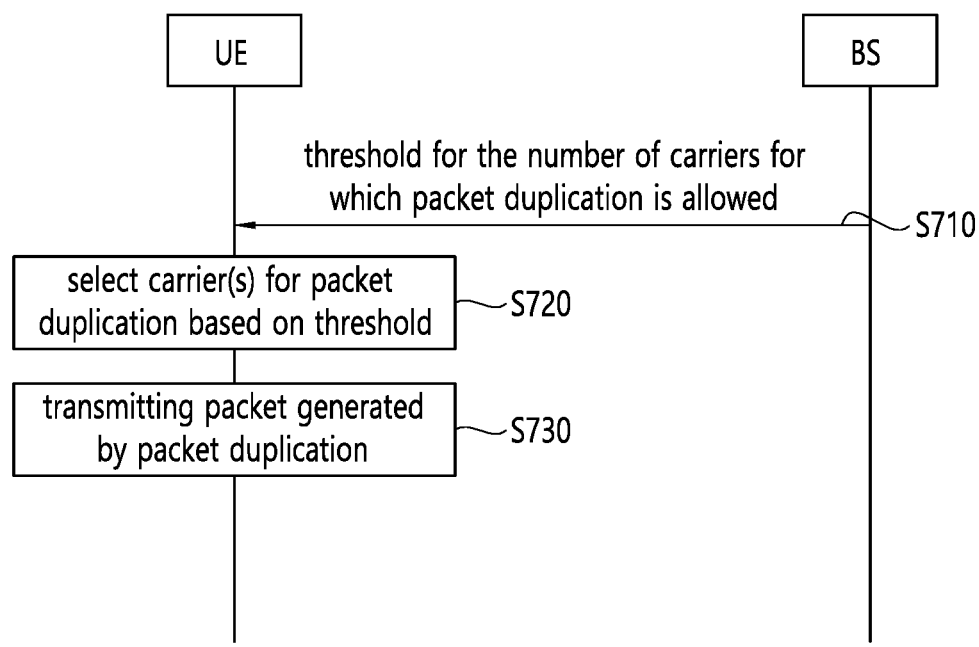
FIG. 7 shows a procedure for controlling the level of packet duplication according to an embodiment of the present invention.

FIG. 7 shows a procedure for controlling the level of packet duplication according to an embodiment of the present invention.

Referring to FIG. 7, in step S710, the UE may receive a threshold value from a base station. The threshold value may be the number of carriers for which the packet duplication is allowed. The threshold value may be provided via broadcast signaling and/or dedicated signaling.

The threshold value may be defined per a CBR (channel busy ratio) level, a priority level, a service identity, a destination identity, and/or a reliability level. For instance, the priority level may be defined by ProSe Per Packet Priority (PPPP). For instance, the service identity may be defined by service identity such as provider service identifier (PSID). For instance, the reliability level may be defined by ProSe Per Packet Reliability (PPPR). The example of reliability level may be described as zero to one positive integer number. Another example of reliability level may be described as {low, medium, high}. If the threshold value is defined per a priority level, a service identity, a destination identity, and/or a reliability level, the network may provide threshold values per a priority level, a service identity, a destination identity, and/or a reliability level.

In step S720, the UE may select at least one carrier for the packet duplication based on the threshold value for the number of carriers for which the packet duplication is allowed. The at least one carrier may be selected based on the threshold value.

When the UE performs the (re)transmission, the UE may be only allowed to perform the packet duplication using the number of carriers smaller than the threshold value. Furthermore, the number of carriers for the packet duplication may exclude the number of carriers for transmitting non-duplicated packets.

If the number of carriers for which the packet duplication is allowed is provided, the UE may select at least one carrier for transmitting duplicated packets within the number of carriers for which the packet duplication is allowed. Further, if the threshold value is defined per a priority level, a service identity, a destination identity, and/or a reliability level, the UE may select at least one carrier for transmitting duplicated packets within the allowed threshold value associated with the priority level, the service identity, the destination identity, and/or the reliability level of a packet (e.g. MAC PDU, PDCP PDU and/or PDCP SDU). The priority of MAC PDU may be lowest value of the priority.

In step S730, the UE may perform the packet duplication on the selected carriers and transmit duplicated packets generated by the packet duplication within the number of carriers of the packet duplication.

According to the embodiment of FIG. 7, the number of carriers used for the packet duplication may be controlled. Further, the number of carriers used for the packet duplication may be controlled per a CBR level, a priority level, a service identity, a destination identity, and/or a reliability level. Thus, the network can manage the sidelink resource pool by controlling the amount of the packet duplication according to an embodiment of the present invention.

Figure 8:
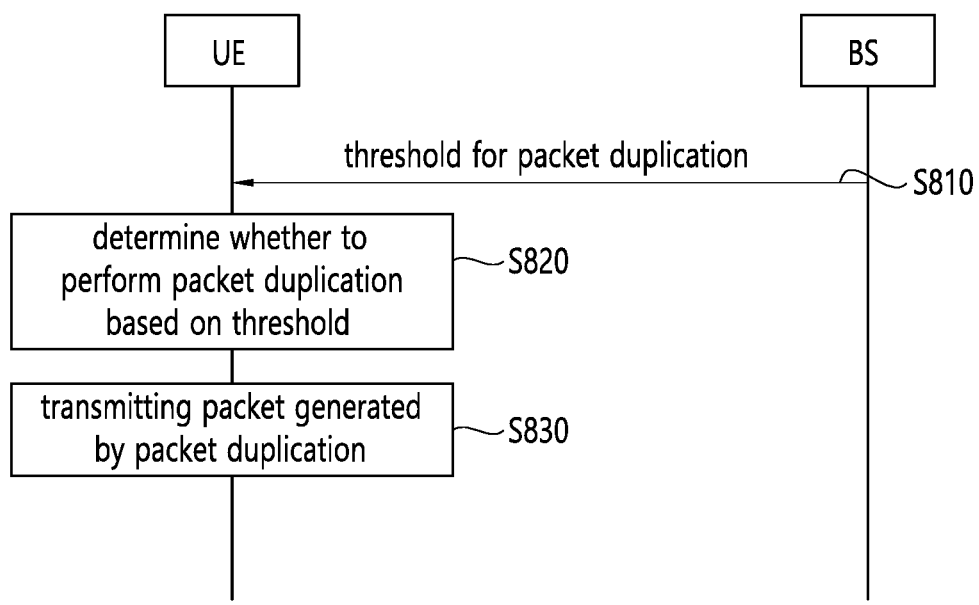
FIG. 8 shows a procedure for controlling the level of packet duplication according to an embodiment of the present invention.

FIG. 8 shows a procedure for controlling the level of packet duplication according to an embodiment of the present invention.

Referring to FIG. 8, in step S810, the UE may receive a threshold for the packet duplication from a base station. The threshold may be provided via broadcast signaling and/or dedicated signaling. The threshold may be defined per a CBR level, a priority level, a service identity, a destination identity, and/or a reliability level. If the threshold is defined per a CBR lever, a priority level, a service identity, a destination identity, and/or a reliability level, the base station or a network may provide thresholds per a CBR level, a priority level, a service identity, a destination identity, and/or a reliability level.

The threshold for the packet duplication may be defined as the allowed number of duplicated packets within a certain time unit. The number of packets for which the packet duplication is allowed may be defined for the UE. Alternatively, the number of packets for which the packet duplication is allowed may be defined for each carrier and/or pool.

The threshold for the packet duplication may be defined as the allowed total number of sub-channels used for its transmissions within a certain time unit. The allowed total number of sub-channels may be defined for the UE. Alternatively, the allowed total number of sub-channels may be defined for each carrier and/or pool. The example of this is to define channel occupancy ratio (CR) for the packet duplication.

In step S820, the UE may determine whether or not to perform the packet duplication based on the threshold for the packet duplication.

Case 1 (Threshold Defined Per CBR Level)

If the threshold is defined per a CBR level, the UE may compare current level of the packet duplication with the threshold associated with a currently measured CBR value of the pool. Alternatively, the UE may compare current level of the packet duplication with the threshold associated with a CBR value signaled by the network.

If the current level of the packet duplication of a PDCP PDU and/or PDCP SDU is less than or equal to the threshold associated with the CBR value, the UE may be allowed to generate duplicated packet (i.e. PDCP PDU and/or PDCP SDU). Otherwise, the PDCP layer of the UE may not generate the duplicated PDCP PDU and/or PDCP SDU except the original PDCP PDU and/or PDCP SDU (i.e. not duplicated PDCP PDU and/or PDCP SDU). For example, the relationship between the CBR value and the threshold may be defined as shown in Table 1.

TABLE 1

| CBR value | Threshold |
|---|---|
| 0 ≤ CBR value < 1 | 2 |
| 1 ≤ CBR value < 2 | 3 |
| 2 ≤ CBR value < 3 | 4 |
| . . . | . . . |

For instance, the UE may measure or receive a CBR value of a pool of a first carrier. If the CBR value is 1, the UE may select the threshold 3 according to Table 1. Then, if the level of the packet duplication is less than the threshold 3, the UE may determine to perform the packet duplication and transmit duplicated packets. Alternatively, if the level of the packet duplication is less than or equal to the threshold 3, the UE may determine to perform the packet duplication and transmit duplicated packets.

Case 2 (Threshold Defined Per Priority Level)

The priority may be defined by ProSe Per Packet Priority (PPPP). If the threshold is defined per a priority level, the UE may compare current level of the packet duplication of priority of PDCP PDU and/or MAC PDU with the threshold associated with the priority of the PDCP PDU and/or MAC PDU.

If the current level of the packet duplication of priority of a MAC PDU is less than or equal to the threshold associated with the priority, the UE may be allowed to transmit duplicated packet (i.e. MAC PDU). Otherwise, the MAC layer of the UE may discard the duplicated MAC PDU except the original MAC PDU (i.e. not duplicated MAC PDU). Alternatively, if the current level of the packet duplication of priority of a MAC PDU is less than or equal to the sum of threshold associated with the lower priority (i.e. higher priority value), the UE may be allowed to transmit duplicated packet (i.e. MAC PDU). Otherwise, the MAC layer of the UE may discard the duplicated MAC PDU except the original MAC PDU (i.e. not duplicated MAC PDU).

If the current level of the packet duplication of priority of a PDCP PDU and/or PDCP SDU is less than or equal to the threshold associated with the priority, the UE may be allowed to generate duplicated packet (i.e. PDCP PDU and/or PDCP SDU). Otherwise, the PDCP layer of the UE may not generate the duplicated PDCP PDU and/or PDCP SDU except the original PDCP PDU and/or PDCP SDU (i.e. not duplicated PDCP PDU and/or PDCP SDU). Alternatively, if the current level of the packet duplication of priority of a PDCP PDU and/or PDCP SDU is less than or equal to the sum of threshold associated with the lower priority (i.e. higher priority value), the UE may be allowed to generate duplicated packet (i.e. PDCP PDU and/or PDCP SDU). Otherwise, the PDCP layer of the UE may not generate the duplicated PDCP PDU and/or PDCP SDU except the original PDCP PDU (i.e. not duplicated PDCP SDU and/or PDU).

Case 3 (Threshold Defined Per Service Identity)

Service may be defined by service identity such as PSID. If the threshold is defined per a service identity, the UE may compare current level of the packet duplication of the service identity of PDCP SDU, PDCP PDU or MAC PDU with the threshold associated with the service identity of the PDCP SDU, PDCP PDU or MAC PDU.

If the current level of the packet duplication of service identity of a MAC PDU is less than or equal to the threshold associated with the service identity, the UE may be allowed to transmit duplicated packet (i.e. MAC PDU). Otherwise, the MAC layer of the UE may discard the duplicated MAC PDU except the original MAC PDU (i.e. not duplicated MAC PDU).

If the current level of packet duplication of service identity of a PDCP SDU and/or PDCP PDU is less than or equal to the threshold associated with the service identity, the UE may be allowed to generate duplicated packet (i.e. PDCP SDU and/or PDCP PDU). Otherwise, the PDCP layer of the UE may not generate the duplicated PDCP SDU and/or PDCP PDU except the original PDCP SDU and/or PDCP PDU (i.e. not duplicated PDCP SDU and/or PDCP PDU).

Case 4 (Threshold Defined Per Destination Identity)

The destination identity may be a destination identity of MAC PDU, PDCP SDU and/or PDCP PDU. If the threshold is defined per a destination identity, the UE may compare current level of the packet duplication of the destination identity of PDCP SDU, PDCP PDU or MAC PDU with the threshold associated with the destination identity of the PDCP SDU, PDCP PDU or MAC PDU.

If the current level of the packet duplication of destination identity of a MAC SDU and/or PDU is less than or equal to the threshold associated with the destination identity, the UE may be allowed to transmit duplicated packet (i.e. MAC SDU and/or MAC PDU). Otherwise, the MAC layer of the UE may discard the duplicated MAC SDU and/or MAC PDU except the original MAC SDU and/or MAC PDU (i.e. not duplicated MAC SDU and/or MAC PDU).

If the current level of the packet duplication of destination identity of a PDCP SDU and/or PDCP PDU is less than or equal to the threshold associated with the destination identity, the UE may be allowed to generate duplicated packet (i.e. PDCP SDU and/or PDCP PDU). Otherwise, the PDCP layer of the UE may not generate the duplicated PDCP SDU and/or PDCP PDU except the original PDCP SDU and/or PDCP PDU (i.e. not duplicated PDCP SDU and/or PDCP PDU).

Case 5 (Threshold Defined Per Reliability Level)

The reliability level may be a reliability level (e.g. PPPR) of MAC PDU, PDCP SDU and/or PDCP PDU. If the threshold is defined per a reliability level, the UE may compare current level of the packet duplication of the reliability level of PDCP SDU, PDCP PDU and/or MAC PDU with the threshold associated with the reliability level of the PDCP SDU, PDCP PDU and/or MAC PDU.

If the current level of the packet duplication of reliability level of a MAC SDU and/or MAC PDU is less than or equal to the threshold associated with the reliability level, the UE may be allowed to transmit duplicated packet (i.e. MAC SDU and/or MAC PDU). Otherwise, the MAC layer of the UE may discard the duplicated MAC SDU and/or MAC PDU except the original MAC SDU and/or MAC PDU (i.e. not duplicated MAC SDU and/or PDU).

If the current level of the packet duplication of reliability level of a PDCP SDU and/or PDCP PDU is less than or equal to the threshold associated with the reliability level, the UE may be allowed to generate duplicated packet (i.e. PDCP SDU and/or PDCP PDU). Otherwise, the PDCP layer of the UE may not generate the duplicated PDCP PDU except the original PDCP SDU and/or PDCP PDU (i.e. not duplicated PDCP SDU and/or PDCP PDU).

For example, the relationship between the reliability level and the threshold may be defined as shown in Table 2.

TABLE 2

| reliability level (e.g. PPPR) | Threshold |
|---|---|
| 0 ≤ PPPR < 0.2 | 1 |
| 0.2 ≤ PPPR < 0.4 | 3 |
| 0.4 ≤ PPPR < 0.6 | 5 |
| . . . | . . . |

For instance, it is assumed that the reliability level of the original PDCP SDU and/or PDCP PDU is 0.5. If so, the threshold is determined as 5 according to Table 2. Then, if the level of the packet duplication of the original PDCP SDU and/or PDCP PDU is less than (or equal to) the threshold 5, the UE may determine to perform the packet duplication and transmit duplicated packets.

Meanwhile, the current level of the packet duplication may be total number of duplicated packets with a certain unit time. Alternatively, the current level of the packet duplication may be total number of sub-channels used for its transmissions within a certain time unit. The above total numbers of duplicated packets may be evaluated per a UE, carrier, pool, priority, service identity and/or destination identity. If the threshold is defined per a UE, carrier, pool, CBR, priority, service identity and/or destination identity, the UE may evaluate the total number of duplicated packets per a UE, carrier, pool, pool, priority, service identity and/or destination identity, respectively. If the threshold is not related to specific carrier(s), the UE may count total number of duplicated packets, total number of sub-channels used for its transmissions in all available carriers. If threshold per a CBR, priority, service identity, destination identity and/or reliability level is configured for a specific carrier, the UE may count total number of duplicated packets, total number of sub-channels used for its transmissions per each carrier.

If the MAC PDU including the original version of MAC SDU which is duplicated into another MAC SDUs is not transmitted due to the CR limit, the UE may not transmit the duplicated packet as well. The CR limit may be assumed to be relevant for transmission of original version of MAC SDU and/or MAC PDU.

In step S830, if the UE determine to perform the packet duplication based on the threshold for the packet duplication, the UE may perform the packet duplication and transmit duplicated packets generated by the packet duplication.

For instance, if the level of the packet duplication is less than (or equal to) the threshold, the UE may perform the packet duplication and transmit duplicated packets generated by the packet duplication.

According to the embodiment of FIG. 8, the number of transmissions (i.e. the number of packet duplications) may be controlled. Further, the number of packet duplications may be controlled per a CBR level, a priority level, a service identity, a destination identity, and/or a reliability level. For instance, the amount of packet duplication can be reduced as the CBR value of the pool of the carrier is larger. For instance, the amount of packet duplication can be reduced as the reliability level of packets is smaller. Thus, the network can manage the sidelink resource pool by controlling the amount of the packet duplication according to an embodiment of the present invention.

Figure 9:
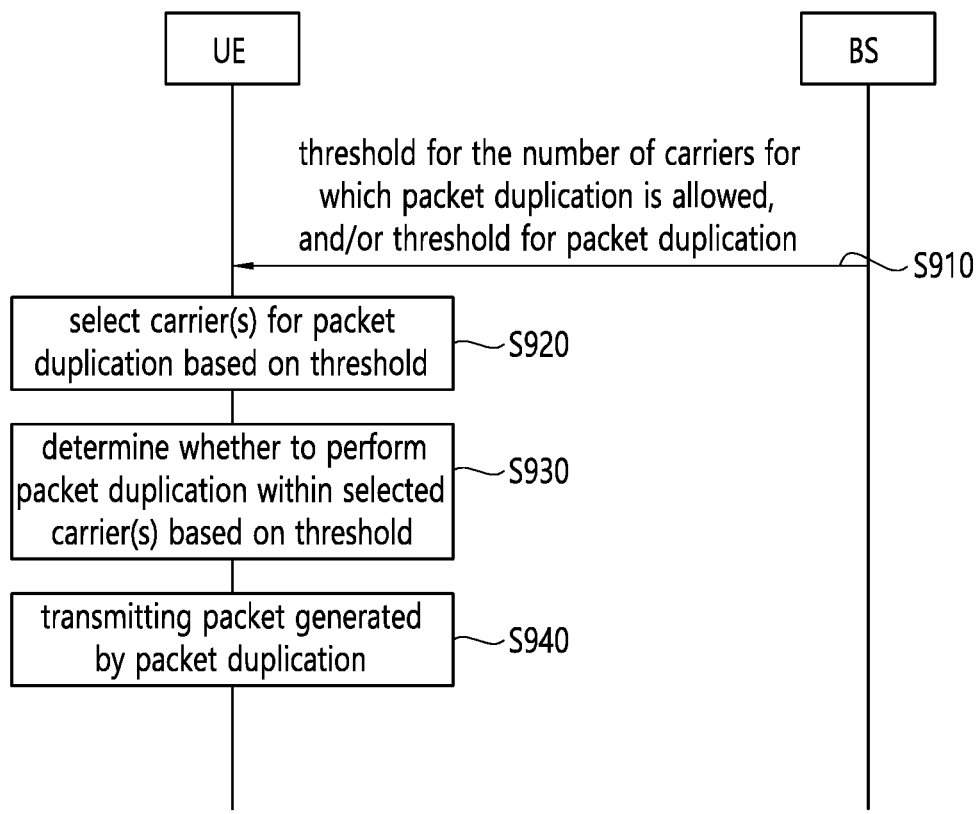
FIG. 9 shows a procedure for controlling the level of packet duplication according to an embodiment of the present invention.

FIG. 9 shows a procedure for controlling the level of packet duplication according to an embodiment of the present invention.

Referring to FIG. 9, in step S910, the UE may receive a first threshold value and/or a second threshold value from a base station. The first threshold value may be the number of carriers for which the packet duplication is allowed. The second threshold value may be a threshold for the packet duplication from a base station. The first threshold value and the second threshold may be provided via broadcast signaling and/or dedicated signaling. The details of the first threshold value and the second threshold value may be referred to FIG. 7 and FIG. 8.

In step S920, the UE may select at least one carrier for the packet duplication based on the first threshold value. The procedure by which the UE selects at least one carrier may be referred to FIG. 7.

In step S930, the UE may determine whether or not to perform the packet duplication within the selected carrier(s) based on the second threshold value. The procedure by which the UE determines to perform the packet duplication may be referred to FIG. 8.

In step S940, if the UE determine to perform the packet duplication based on the second threshold value, the UE may perform the packet duplication within the selected carrier(s) and transmit duplicated packets generated by the packet duplication.

Hereinafter, the UE behavior is described according to an embodiment of the present invention.

If the threshold is defined per a UE, the UE may evaluate the current level of packet duplication for all the carriers. If the current level of packet duplication is less than (or equal to) the threshold, the PDCP layer of UE may be allowed to generate duplicated PDCP SDU and/or PDCP PDUs within the threshold and transmit the duplicated packets. Otherwise, PDCP layer of the UE may not generate the duplicated PDCP SDU and/or PDCP PDUs in any carriers.

If the threshold is defined per a UE, the UE may evaluate the current level of packet duplication for all the carriers. If the current level of packet duplication is less than (or equal to) the threshold, MAC layer of UE may be allowed to transmit MAC PDUs including duplicated MAC SDUs within the threshold and transmit the MAC PDUs including duplicated MAC SDUs. Otherwise, the UE may discard the duplicated MAC SDUs and/or PDUs in any carriers.

If the threshold is defined per a carrier and/or a pool, the UE may evaluate the current level of packet duplication for each carriers and/or pool. If the current level of packet duplication per carrier and/or pool is less than (or equal to) the threshold, the PDCP layer of UE may be allowed to generate duplicated PDCP SDU and/or PDCP PDUs within the threshold and transmit the duplicated packets in the concerned carrier and/or pool. Otherwise, PDCP layer of the UE may not generate the duplicated PDCP SDU and/or PDCP PDUs in the concerned carrier and/or pool. If the UE is not allowed to transmit the duplicated packets in the concerned carrier and/or pool, the UE may trigger select another carrier which allows the packet duplication.

If the threshold is defined per a carrier and/or a pool, the UE may evaluate the current level of packet duplication for each carrier and/or pool. If the current level of packet duplication per carrier and/or pool is less than (or equal to) the threshold, MAC layer of UE may be allowed to transmit MAC PDUs including duplicated MAC SDUs within the threshold and transmit the MAC PDUs including duplicated MAC SDUs in the concerned carrier and/or pool. Otherwise, the UE may discard the duplicated MAC SDUs and/or PDUs in the concerned carrier and/or pool. If the UE is not allowed to transmit the duplicated packets in the concerned carrier and/or pool, the UE may trigger select another carrier which allows the packet duplication.

If the threshold is defined per a CBR level of the pool, priority, service identity, destination identity and/or reliability level per carrier and/or pool and the application layer packet is generated, the UE may evaluate the current level of packet duplication per each pool, priority, service identity, destination identity and/or reliability level in each carrier and/or pool. If the current level of packet duplication per each pool, priority, service identity, destination identity and/or reliability level in each carrier and/or pool is less than the threshold associated with the current CBR level of the pool, priority, service identity, destination identity and/or reliability level of each carrier and/or pool, the PDCP layer of UE may be allowed to generate duplicated PDCP SDU and/or PDCP PDUs within the threshold and transmit the duplicated packets in the concerned carrier and/or pool. Otherwise, PDCP layer of the UE may not generate the duplicated PDCP SDU and/or PDCP PDUs in the concerned carrier and/or pool. If the UE is not allowed to transmit the duplicated packets in the concerned carrier and/or pool, the UE may trigger select another carrier which allows the packet duplication.

If the threshold is defined per a CBR level of the pool, priority, service identity, destination identity and/or reliability level per carrier and/or pool and the application layer packet is generated, the UE may evaluate the current level of packet duplication per each pool, priority, service identity, destination identity and/or reliability level in each carrier and/or pool. If the current level of packet duplication per each pool, priority, service identity, destination identity and/or reliability level in each carrier and/or pool is less than the threshold associated with the current CBR level of the pool, priority, service identity, destination identity and/or reliability level of each carrier and/or pool, MAC layer of UE may be allowed to transmit MAC PDUs including duplicated MAC SDUs within the threshold and transmit the MAC PDUs including duplicated MAC SDUs in the concerned carrier and/or pool. Otherwise, the UE may discard the duplicated MAC SDUs and/or MAC PDUs in the concerned carrier and/or pool. If the UE may be not allowed to transmit the duplicated packets in the concerned carrier and/or pool, the UE may trigger select another carrier which allows the packet duplication.

According to an embodiment of the present invention, the network is able to control the level of duplication while guaranteeing the reliability of the packet.

Figure 10:
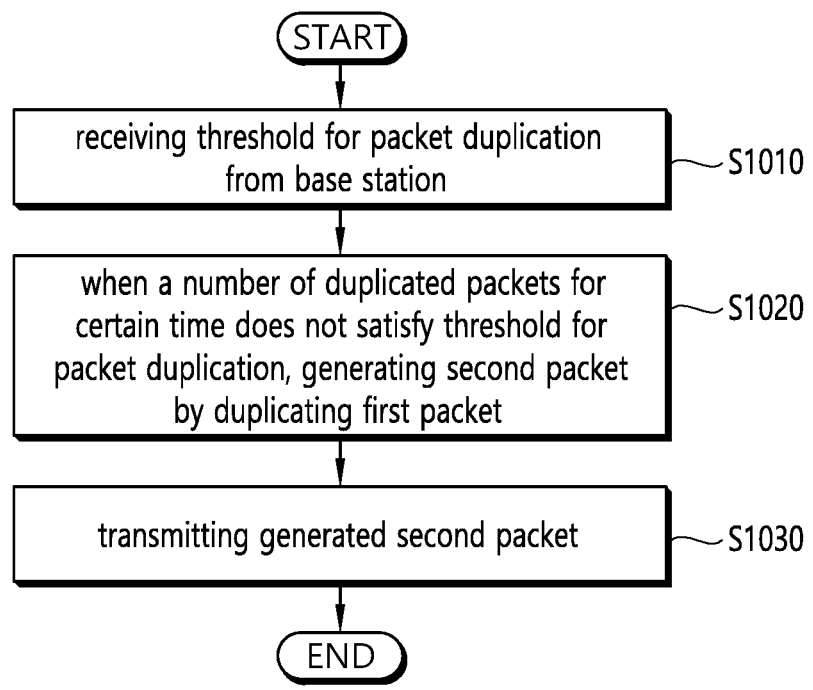
FIG. 10 shows a method for generating a packet by a UE according to an embodiment of the present invention.

FIG. 10 shows a method for generating a packet by a UE according to an embodiment of the present invention. The present invention described above for UE side may be applied to this embodiment.

Referring to FIG. 10, in step S1010, the UE may receive at least one threshold for packet duplication from a base station.

In step S1020, the UE may generate a second packet by duplicating a first packet when the number of duplicated packets for a certain time does not satisfy the threshold for the packet duplication. For instance, the UE may generate a second packet by duplicating a first packet when the number of duplicated packets for a certain time is less than or equal to a specific threshold for the packet duplication. The specific threshold may be selected by the UE from among the at least one threshold, based on a CBR level, a priority level, a service identity, a destination identity, and/or a reliability level.

Alternatively, the UE may not generate the second packet when the number of duplicated packets for the certain time satisfies the threshold for the packet duplication. For instance, the UE may not generate the second packet when the number of duplicated packets for a certain time is larger than the specific threshold for the packet duplication. Further, the UE may select a second carrier which allows the packet duplication when the number of duplicated packets for the certain time satisfies the threshold for the packet duplication in a first carrier.

The threshold for the packet duplication may be defined per a CBR value. In this case, the UE may measure the CBR value of a pool of a carrier, and select the threshold from among the at least one threshold based on the CBR level of the carrier. The threshold for the packet duplication may be related to the measured CBR value of the pool of the carrier. Alternatively, the UE may receive the CBR value of a pool of a carrier from the base station, and select the threshold from among the at least one threshold based on the CBR level of the carrier. The threshold for the packet duplication may be related to the received CBR value of the pool of the carrier.

The threshold for the packet duplication may be defined per a carrier. The threshold for the packet duplication may be defined per a reliability level. The reliability level may be ProSe Per Packet Reliability (PPPR). The threshold for the packet duplication may be related to the reliability level of the first packet. The threshold for the packet duplication may be defined per a destination identity, a service identity or a priority level.

In step S1030, the UE may transmit the generated second packet. The generated second packet may be transmitted via sidelink transmission. The second packet may be duplicated PDCP PDU. Further, the UE may transmit the first packet which is original PDCP PDU.

Figure 11:
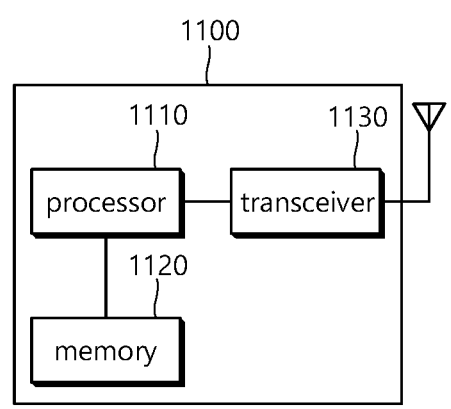
FIG. 11 shows a UE to implement an embodiment of the present invention.

FIG. 11 shows a UE to implement an embodiment of the present invention. The present invention described above for UE side may be applied to this embodiment.

A UE 1100 includes a processor 1110, a memory 1120 and a transceiver 1130. The processor 1110 may be configured to implement proposed functions, procedures and/or methods described in this description. Layers of the radio interface protocol may be implemented in the processor 1110.

Specifically, the processor 1110 may control the transceiver 1130 to receive at least one threshold for packet duplication from a base station.

Further, the processor 1110 may generate a second packet by duplicating a first packet when the number of duplicated packets for a certain time does not satisfy the threshold for the packet duplication. For instance, the processor 1110 may generate a second packet by duplicating a first packet when the number of duplicated packets for a certain time is less than or equal to a specific threshold for the packet duplication. The specific threshold may be selected by the processor 1110 from among the at least one threshold, based on a CBR level, a priority level, a service identity, a destination identity, and/or a reliability level.

Alternatively, the processor 1110 may not generate the second packet when the number of duplicated packets for the certain time satisfies the threshold for the packet duplication. For instance, the processor 1110 may not generate the second packet when the number of duplicated packets for a certain time is larger than the specific threshold for the packet duplication. Further, the processor 1110 may select a second carrier which allows the packet duplication when the number of duplicated packets for the certain time satisfies the threshold for the packet duplication in a first carrier.

The threshold for the packet duplication may be defined per a CBR value. In this case, the processor 1110 may measure the CBR value of a pool of a carrier, and select the threshold from among the at least one threshold based on the CBR level of the carrier. The threshold for the packet duplication may be related to the measured CBR value of the pool of the carrier. Alternatively, the processor 1110 may control the transceiver 1130 to receive the CBR value of a pool of a carrier from the base station, and select the threshold from among the at least one threshold based on the CBR level of the carrier. The threshold for the packet duplication may be related to the received CBR value of the pool of the carrier.

The threshold for the packet duplication may be defined per a carrier. The threshold for the packet duplication may be defined per a reliability level. The reliability level may be ProSe Per Packet Reliability (PPPR). The threshold for the packet duplication may be related to the reliability level of the first packet. The threshold for the packet duplication may be defined per a destination identity, a service identity or a priority level.

In step S1030, the processor 1110 may control the transceiver 1130 to transmit the generated second packet. The generated second packet may be transmitted via sidelink transmission. The second packet may be duplicated PDCP PDU. Further, the processor 1110 may control the transceiver 1130 to transmit the first packet which is original PDCP PDU.

The memory 1120 is operatively coupled with the processor 1110 and stores a variety of information to operate the processor 1110. The transceiver 1130 is operatively coupled with the processor 1110, and transmits and/or receives a radio signal.

Figure 12:
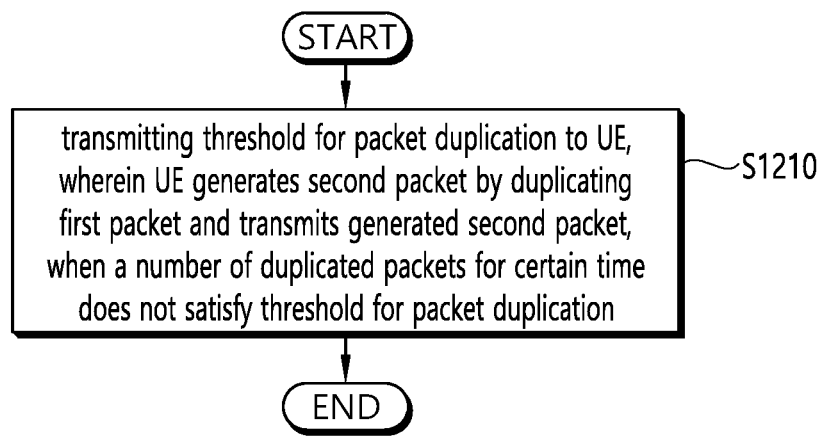
FIG. 12 shows a method for transmitting a threshold for packet duplication by a BS according to an embodiment of the present invention.

FIG. 12 shows a method for transmitting a threshold for packet duplication by a BS according to an embodiment of the present invention. The present invention described above for BS side may be applied to this embodiment.

Referring to FIG. 12, in step S1210, the BS may transmit at least one threshold for packet duplication to the UE. After then, the UE may generate a second packet by duplicating a first packet and transmit the generated second packet, when the number of duplicated packets for a certain time does not satisfy the threshold for the packet duplication. At least one threshold may be provided by the BS per a CBR level, a priority level, a service identity, a destination identity, and/or a reliability level.

The threshold for the packet duplication may be defined per a CBR value. In this case, the BS may transmit the CBR value of a pool of a carrier to the UE. Then, the UE may select the threshold from among the at least one threshold based on the CBR level of the carrier. The threshold for the packet duplication may be related to the received CBR value of the pool of the carrier.

The threshold for the packet duplication may be defined per a carrier. The threshold for the packet duplication may be defined per a reliability level. The reliability level may be ProSe Per Packet Reliability (PPPR). The threshold for the packet duplication may be related to the reliability level of the first packet. The threshold for the packet duplication may be defined per a destination identity, a service identity or a priority level.

Figure 13:
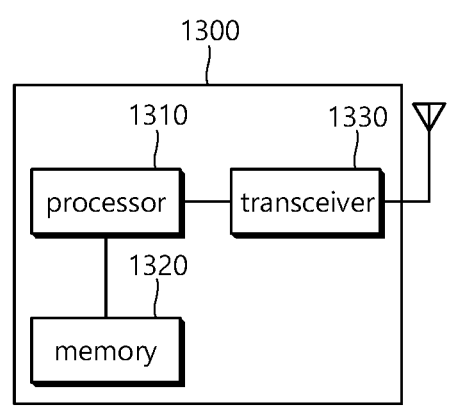
FIG. 13 shows a BS to implement an embodiment of the present invention.

FIG. 13 shows a BS to implement an embodiment of the present invention. The present invention described above for BS side may be applied to this embodiment.

A BS 1300 includes a processor 1310, a memory 1320 and a transceiver 1330. The processor 1310 may be configured to implement proposed functions, procedures and/or methods described in this description. Layers of the radio interface protocol may be implemented in the processor 1310.

Specifically, the processor 1310 may control the transceiver 1330 to transmit at least one threshold for packet duplication to the UE. After then, the UE may generate a second packet by duplicating a first packet and transmit the generated second packet, when the number of duplicated packets for a certain time does not satisfy the threshold for the packet duplication. At least one threshold may be provided by the BS per a CBR level, a priority level, a service identity, a destination identity, and/or a reliability level.

The threshold for the packet duplication may be defined per a CBR value. In this case, the processor 1310 may control the transceiver 1330 to transmit the CBR value of a pool of a carrier to the UE. Then, the UE may select the threshold from among the at least one threshold based on the CBR level of the carrier. The threshold for the packet duplication may be related to the received CBR value of the pool of the carrier.

The threshold for the packet duplication may be defined per a carrier. The threshold for the packet duplication may be defined per a reliability level. The reliability level may be ProSe Per Packet Reliability (PPPR). The threshold for the packet duplication may be related to the reliability level of the first packet. The threshold for the packet duplication may be defined per a destination identity, a service identity or a priority level.

The memory 1320 is operatively coupled with the processor 1310 and stores a variety of information to operate the processor 1310. The transceiver 1330 is operatively coupled with the processor 1310, and transmits and/or receives a radio signal.

The processor 1110, 1310 may include an application-specific integrated circuit (ASIC), a separate chipset, a logic circuit, and/or a data processing unit. The memory 1120, 1320 may include a read-only memory (ROM), a random access memory (RAM), a flash memory, a memory card, a storage medium, and/or other equivalent storage devices. The transceiver 1130, 1330 may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor 1110, 1310. The memory 1120, 1320 may be located inside or outside the processor 1110, 1310, and may be coupled to the processor 1110, 1310 by using various well-known means.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method for generating a packet by a user equipment (UE), the method comprising:
    measuring a channel busy ratio (CBR) value for a resource pool in a first carrier;
    receiving, from a base station, a plurality of first thresholds for determining a number of duplicated packets, wherein each of the plurality of first thresholds is related to a corresponding CBR range of a plurality of CBR ranges;
    determining a second threshold related to a CBR range to which the CBR value belongs, among the plurality of first thresholds; and
    based on the number of duplicated packets being less than the second threshold for a certain time, generating a second packet by duplicating a first packet,
    wherein, based on the number of duplicated packets being larger than or equal to the second threshold for the certain time, the UE is not allowed to duplicate the first packet.

2. The method of claim 1, wherein each of the plurality of first thresholds is related to a corresponding reliability level of a plurality of reliability levels.

3. The method of claim 2, wherein the plurality of reliability levels are ProSe Per Packet Reliabilities (PPPRs).

4. The method of claim 2, wherein the second threshold for determining the number of duplicated packets is related to a reliability level of the first packet.

5. The method of claim 1, wherein the second threshold for determining the number of duplicated packets is defined per a destination identity, a service identity or a priority level.

6. The method of claim 1, further comprising:
    transmitting the second packet which is duplicated packet data convergence protocol (PDCP) protocol data unit (PDU).

7. The method of claim 1, further comprising:
    transmitting the first packet which is original packet data convergence protocol (PDCP) protocol data unit (PDU).

8. The method of claim 1, wherein the UE communicates with at least one of a mobile terminal, a network or autonomous vehicles other than the UE.

9. The method of claim 1, further comprising:
    receiving, from the base station, a plurality of third thresholds for determining a number of carriers for transmitting duplicated packets, wherein each of the plurality of third thresholds is related to a corresponding CBR range of the plurality of CBR ranges; and
    determining a fourth threshold related to the CBR range to which the CBR value belongs, among the plurality of third thresholds.

10. The method of claim 9, wherein, based on the number of carriers, which is selected for transmitting duplicated packets, being less than the fourth threshold, the UE is allowed to select a second carrier for which packet duplication is allowed.

11. The method of claim 9, wherein, based on the number of carriers, which is selected for transmitting duplicated packets, being larger than or equal to the fourth threshold, the UE is not allowed to select a second carrier for which packet duplication is allowed.

12. A user equipment (UE) for generating a packet, the UE comprising:

a memory;

a transceiver; and a processor connected with the memory and the transceiver, wherein the processor is configured to:

measure a channel busy ratio (CBR) value for a resource pool in a first carrier;

control the transceiver to receive, from a base station, a plurality of first thresholds for determining a number of duplicated packets, wherein each of the plurality of first thresholds is related to a corresponding CBR range of a plurality of CBR ranges;

determine a second threshold related to a CBR range to which the CBR value belongs, among the plurality of first thresholds; and based on the number of duplicated packets being less than the second threshold for a certain time, generate a second packet by duplicating a first packet, wherein, based on the number of duplicated packets being larger than or equal to the second threshold for the certain time, the UE is not allowed to duplicate the first packet.

\* \* \* \* \*